March 19, 1929.  T. V. BUCKWALTER  1,705,555
RAILWAY CAR JOURNAL BOX CONSTRUCTION
Filed Nov. 9, 1927
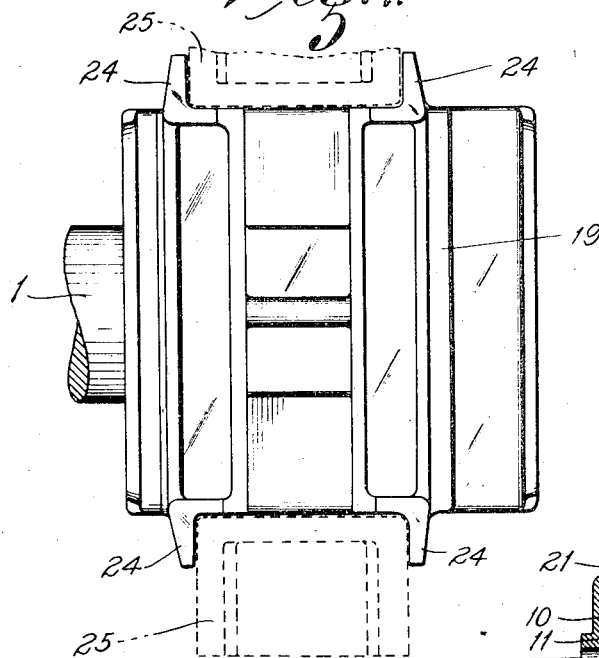
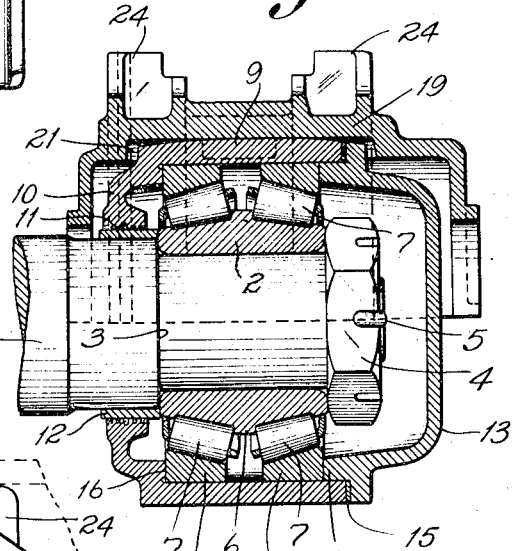
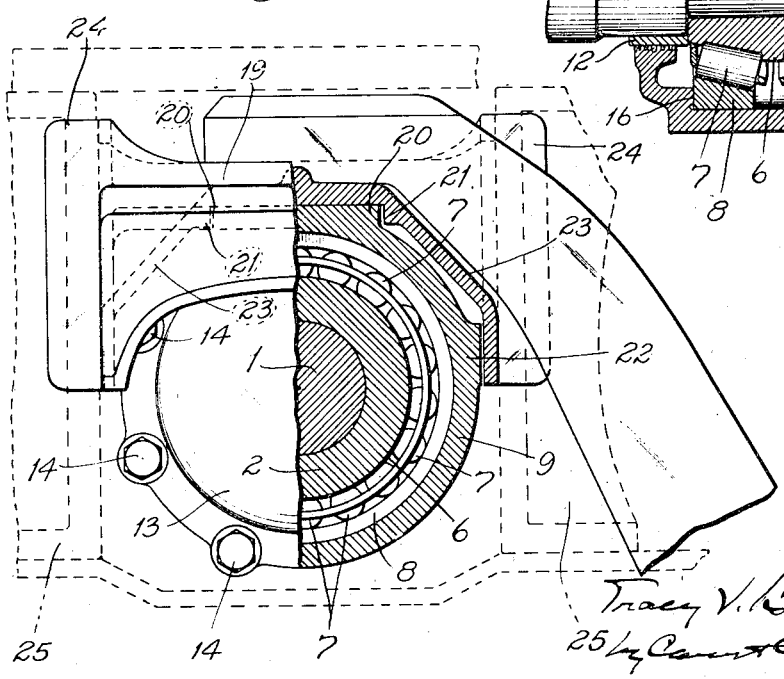
INVENTOR:
Tracy V. Buckwalter
by his Attorneys.

Patented Mar. 19, 1929.

1,705,555

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

RAILWAY-CAR-JOURNAL-BOX CONSTRUCTION.

Application filed November 9, 1927. Serial No. 232,012.

My invention relates to railway car journal boxes. Its principal objects are to provide for the use of taper roller bearings, and especially a bearing having two series of taper rollers, and to obtain a correct distribution of the stresses between the two series. Another object is to take care of the end thrust between the journal box and the pedestal more advantageously than heretofore has been practicable. Another object is to effect a great saving in weight.

The invention consists principally in designing the journal box so that the pedestal guides will extend substantially equal distances above and below the center points of their thrust reaction. It also consists in a design wherein the outer housing member for the journal box has its lower margin substantially level with the axis of the axle. It also consists in the construction hereinafter described.

In the accompanying drawing, wherein like reference numerals refer to like parts wherever they occur, Fig. 1 is a plan view of a saddle member construction conforming to my invention, Fig. 2 is a vertical section of a journal box construction conforming to my invention; and Fig. 3 is partly an end elevation and partly a vertical cross-sectional view of said construction showing the equalizer bar of a truck in position relative thereto.

The portion of car axle 1 corresponding to the journal portion of the ordinary car axle is of reduced diameter, and has mounted thereon the inner raceway member 2 of a roller bearing. In the construction shown, this inner raceway member is a sleeve which is press-fitted on the axle and has its inner end abutting against a shoulder 3 formed by reducing the diameter of said axle. The end portion of the axle is further reduced in diameter and screw threaded; and the sleeve, which constitutes the inner raceway member, is long enough to slightly overhang the threaded end portion of the axle. A threaded nut 4 works on this threaded portion and is provided with a suitable locking device 5. The inner face of this nut bears against the outer end of the inner raceway member and serves to hold it in position.

In the construction shown, the inner raceway member has a circumferential rib 6 about midway of its length, and from this rib it tapers in both directions toward ribs at the ends thereof. Surrounding the conical bearing surfaces thus formed are two series of tapered rollers 7 that cooperate therewith and with the outer raceway members or cups 8 provided therefor in a bearing housing. This housing comprises a hollow main member 9 of generally cylindrical form, with its outer end open and with its inner end made in the form of an annular flange 10 with a central hole large enough to receive the axle and having its inner surface grooved to receive felt or packing 11 that bears on a bushing 12 mounted on the axle so as to exclude dust from the bearing.

The second member 13 of the housing is in the form of a cap or closure for the open outer end of the main housing member to which said cap is secured by cap screws 14 that pass through the margin thereof into the wall of the main housing member. For the sake of adjustability, annular shims 15 are interposed between said main housing member and said closure cap. The inner end portion of the main housing member has formed therein a seat 16 for the inner of the two conical cups or outer raceway members 8 with which the antifriction rollers cooperate; and the outer of said cups or outer raceway members has a sliding fit in the outer portion of said main housing member. The cap member has an annular flange 18 on its inner face that enters the open end of the main housing member and has a cylindrical surface that fits the inner cylindrical surface of said main housing member. The inner end of said flange bears against the outer of the two outer raceway members and serves to position said raceway member.

While the main member of the bearing housing is of generally cylindrical form, the outer surfaces of its top and sides are shaped for cooperation with a member 19 that rests thereon and is hereinafter designated as a saddle member. The top surface of the main housing member is made substantially flat to form a seat for said saddle member but the end portions of such seat are convexed to permit a rolling or rocking movement. The sides of the flat top constitute shoulders 20 that serve to take thrust transmitted thereto by the saddle member which has shoulders or ribs 21 formed on its underside for the purpose. Likewise, the sides 22 of the main member of the bearing housing are thickened and flattened or otherwise suitably adapted to serve as abutments for the depending sides of the saddle member to bear against when occasion requires.

The saddle member has the middle portion of its under surface formed with a flat recess of slightly greater width and length than the seat provided therefor on the top of the bearing housing; whereby the walls 23 of said recess are normally spaced away from the ends and sides of said seat but bear against the same under certain service conditions. At each side, the saddle member is provided with a pair of vertically disposed ribs 24 that are preferably integral therewith and constitute guides for the pedestal 25 of a truck side frame. The guide portions extend downwardly about to the level of the axis of the axle and are normally spaced slightly from the flattened sides of the bearing housing against which they bear under certain service conditions. Said guide portions extend upwardly above the level of the seat for the saddle member for an appreciable distance; that is, they preferably extend nearly as far above the center point of the thrust reaction between the shoulder of the seat of the bearing housing and the wall of the recess in the saddle member, and this center point is only slightly below the seat at the top of the bearing housing.

Notches are formed in the upper side edges of the saddle member for the purpose of receiving the equalizing bar of the truck; and the notch forming portions of the saddle member are received in notches provided therefor in the upper edges of the bearing housing.

The saddle member has the usual rib in its upper surface adapted to form a seat for the equalizing bar of the truck.

It is noted that, in comparison with the usual truck construction, applicant has eliminated the whole lower portion of the corresponding member of the old construction. By way of explanation thereof, it is noted that the end thrust reaction between the pedestal and the pedestal guides is centered opposite the contacing shoulders of the housing and of the saddle member, that is to say, shortly below the seat of the saddle on the top of said housing member. Accordingly, only a comparatively short length of guide above and below this level is effective in taking care of the thrust reaction, and, by balancing the action above and below this level, it is practicable to dispense with much of the lower part of the outer housing and pedestal guides of the old construction and thus effect a great saving of weight.

What I claim is:

1. In combination with a railway journal box construction of generally cylindrical form having a substantially flat horizontal top with shoulders at the ends thereof and substantially flat vertical spots on its diametrically opposite sides, a saddle mounted on the box with slight clearance opposite said shoulders and said flat spots and having vertical ribs that constitute pedestal guideways that extend substantially equal distances above and below the level of said shoulders.

2. In combination with an axle, a bearing housing of generally cylindrical form having a substantially flat horizontal top with shoulders at the ends thereof and substantially flat vertical spots on its diametrically opposite sides, a roller bearing interposed between said axle and said housing, a saddle mounted on said housing with slight clearance opposite said shoulders and said flat spots and having vertical ribs that constitute pedestal guideways that extend substantially equal distances above and below the level of said shoulders.

3. In combination with an axle, a bearing housing of generally cylindrical form having a substantially flat horizontal top with shoulders at the ends thereof and substantially flat vertical spots on its diametrically opposite sides and roller bearings interposed between said axle and said housing, a saddle mounted on said housing with slight clearance opposite said shoulders and said flat spots and having vertical ribs that constitute pedestal guideways that extend substantially equal distances above and below the level of said shoulders.

4. In combination with a railway journal box construction wherein the top of the box constitutes a substantially flat seat with shoulders at its margins, a saddle member having a recess in its lower face to receive said seat with clearance between said shoulders and the walls of said recess, said saddle having pedestal guideways that terminate near the level of the axis of the journal and extend substantially equal distances above and below the walls of said recess.

5. A truck comprising axles, journal boxes therefor, saddles on said journal boxes, equalizers supported by said saddles, and side frames supported by said equalizers, said side frames having pedestals, and said saddles having guideways therefor whose lower ends terminate near the level of the axes of the axles and whose upper ends extend an appreciable distance above the tops of the journal boxes, said ends extending substantially equal distances above and below the level of the center points of the thrust reaction between said pedestals and pedestal guides.

6. A truck comprising axles, journal boxes therefor, saddles on said journal boxes, equalizers supported by said saddles, and side frames supported by said equalizers, said side frames having pedestals, and said saddles having guideways therefor, the lower ends of said saddles and the guideways thereof terminating near the level of the axes of the axles and the upper ends of said guideways extending an appreciable distance above the tops of the journal boxes, said ends extending substantially equal distances above and below the level of the center points of the thrust reaction between said pedestals and pedestal guides.

Signed at Canton, Ohio, this 2d day of Nov., 1927.

TRACY V. BUCKWALTER.